United States Patent [19]

Katsof et al.

[11] Patent Number: 4,700,295
[45] Date of Patent: Oct. 13, 1987

[54] SYSTEM AND METHOD FOR FORECASTING BANK TRAFFIC AND SCHEDULING WORK ASSIGNMENTS FOR BANK PERSONNEL

[76] Inventors: Barry Katsof, 176 Highfield Ave., Town of Mount Royal, Quebec, Canada, H3P 1C8; Ronald G. Waxman, 73 Manuel Drive, Dollard-des-Ormeaux, Quebec, Canada; Joel Matlin, 3922 Chesswood Drive, Downsview, Ontario, Canada, M3L 2W6

[21] Appl. No.: 724,480

[22] Filed: Apr. 18, 1985

[51] Int. Cl.⁴ .................... G08B 7/00; G07C 9/00
[52] U.S. Cl. .................... 364/401; 235/379; 340/286 R; 377/6; 377/20
[58] Field of Search ........... 364/401, 402, 569, 550; 340/286; 377/6, 20; 235/379

[56] References Cited

U.S. PATENT DOCUMENTS

| | | | |
|---|---|---|---|
| 3,727,034 | 4/1973 | Pope | 377/6 |
| 4,122,331 | 10/1978 | Tsubota et al. | 377/6 |
| 4,127,766 | 11/1978 | Thayer | 377/6 |
| 4,303,851 | 12/1981 | Mottier | 377/6 |
| 4,398,257 | 8/1983 | Paganini et al. | 364/550 |
| 4,528,679 | 7/1985 | Shahbaz et al. | 377/6 |

FOREIGN PATENT DOCUMENTS 1137615 2/1982 Canada .

OTHER PUBLICATIONS

"Computer Channel Interference Analysis"; W. Chang, D. J. Wong, Nov. 1965; 162–120, IBM Systems Journal, vol. 4, No. 2.

Primary Examiner—Jerry Smith
Assistant Examiner—Kim Thanh T. Bui
Attorney, Agent, or Firm—Schwartz, Jeffery, Schwaab, Mack, Blumenthal & Evans

[57] ABSTRACT

A method and system for forecasting bank traffic and teller utilization and for scheduling work assignments for bank personnel based on the forecasts includes data gathering apparatus and steps and data processing apparatus and steps.

1 Claim, 4 Drawing Figures

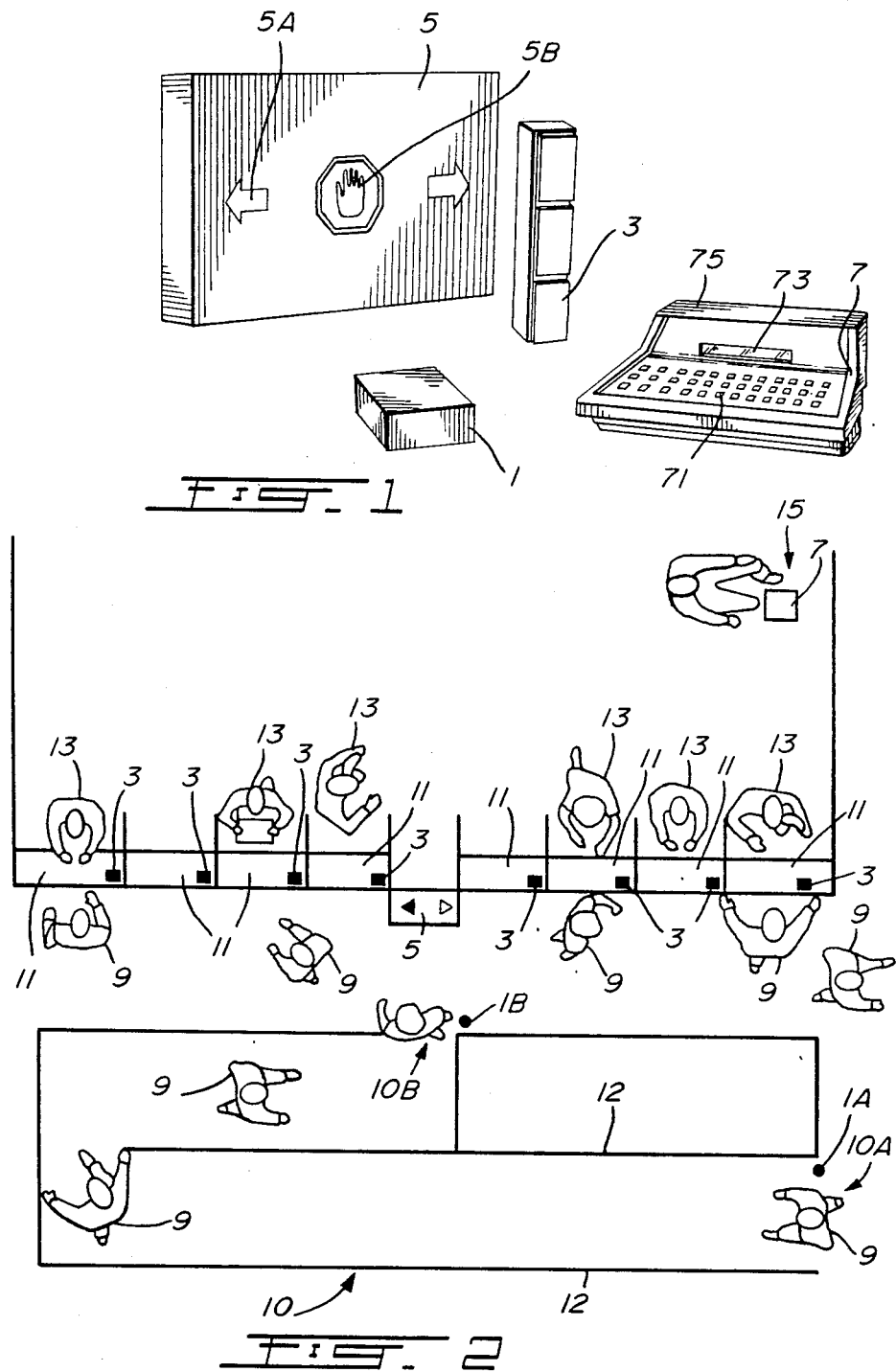

SYSTEM AND METHOD FOR FORECASTING BANK TRAFFIC AND SCHEDULING WORK ASSIGNMENTS FOR BANK PERSONNEL

BACKGROUND OF THE INVENTION

1. Field of the Invention

The invention relates to a method and system for forecasting bank traffic and teller utilization. The invention also relates to a method and system for scheduling work assignments for bank personnel based on the forecast. More specifically, the invention relates to such methods and systems for continuously gathering bank traffic data and teller occupation statistics for such forecasts and schedules.

2. Description of Prior Art

Information concerning levels of traffic flow in the bank is very important to the bank management as they attempt to arrive at a satisfactory compromise between cost of staff and service to the customer. The most obvious bank area in which this pertains is the teller station. Typically, especially during busy hours, such as lunch hours, and during busy days, such as pay days, customers must wait in a queue before being served by a teller.

Increasing the number of tellers will, of course, reduce the waiting time for the customers, but it does so only at a financial cost in the provision of extra teller stations and the payment of increased staff—so that the solution has only a limited applicability. For example, the number of stations may be fixed due to space limitations, and the number of tellers which can be hired may be limited due to budgetary limitations.

Even when there are a large number of tellers, for financial reasons, they must be utilized efficiently. Waiting for customers who are not there at teller stations does not constitute such efficient use so that, typically, tellers in banks are assigned "desk" chores as compared to station chores. If the philosophy of banks were merely to send tellers to the stations when customers appear, the teller's desk work would be subject to many interruptions—which would lead to reduced efficiency of the desk work.

Maximum efficiency, coupled with maximum customer service, is best accomplished by scheduling desk times and station times for each teller based on accurate prediction of levels of traffic at the bank during different hours of the day. This will permit the tellers to plan their desk work for the most efficient performance thereof, while ensuring, at most, acceptably short waits for the customers.

In order to generate such predictions, it is necessary to gather, not only sufficient, but also relevant and accurate data. It is necessary not only to gather such data, but also to subject it to meaningful and appropriate analysis.

Although the level of traffic in a banking environment varies from day to day, and from hour to hour in each day, the variation is not erratic and unpredictable, but follows patterns which can be determined if sufficient and accurate data can be gathered. However, the patterns themselves may be subject to variation, so that the gathering of data cannot be a single effort project—but must be carried on on a continuous basis.

In addition, the data cannot be of a generalized nature, i.e., "Friday afternoons are busy", but must be of a specific and accurate nature indicating, for example, both the rate of customer arrivals and the time at which to expect the specific arrival rates as well as rate changes and times of such changes.

Because of the difficulty and expense of gathering such data, and because of the lack of appropriate analytical tools, the forecasting of traffic in banks, and appropriate scheduling of bank personnel based on such forecasts, is very rare to the possible detriment of the banks.

Forecasting can also be useful for a different purpose. With the advent of ATM's (Automatic Teller Machines, i.e., machines which perform all or some of the functions of a teller in the teller-customer relationship), it would be possible to provide faster service at a lesser cost if the customers would be willing to use these machines. As ATM's are expensive, it would not be economically sound to purchase machines if they are not going to be used. However, if they are used, they can bring improvements in both costs and service—so that there is an incentive to introduce them. Once again, a forecasting method and system would be useful to predict the extent of the use of such ATM's for installation planning.

The forecasting method and system should also be useful to measure the customer waiting tolerance, i.e., the amount of time a customer will wait before he leaves the bank without being served. This concept can also be used in the placement of ATM's in the banks.

In order to be useful in a banking environment, the method and system must be relatively inexpensive, accurate and unobtrusive.

SUMMARY OF THE INVENTION

It is therefore an object of the invention to provide a method and system for forecasting bank traffic and for scheduling bank personnel work assignments based on the forecast.

It is a more specific object of the invention to provide such a method and system for continuously gathering data for such forecast and schedules.

It is an even more specific object of the invention to provide a method and system whereby the arrivals and departures of customers are continually measured.

In accordance with the invention, there is provided a system for forecasting customer traffic and teller utilization at a bank, the system including data gathering means and data processing means. The data gathering means senses the arrival and departure of customers and the data processing means counts the arrivals and departures. The data gathering means also determines when a teller is at a station, and the data processing means measures the amount of time that the teller is available at each station and it also measures the amount of time that the teller at each station is active.

The invention also relates to a method of forecasting customer traffic and teller utilization at a bank, the method including the steps of sensing the arrival of customers, recording the number of arrivals, sensing departures of customers, recording the number of departures, determining whether tellers are available at a station, recording the amount of time that a teller is available at each station, determining whether a teller at a station is active, recording the amount of time that a teller at each station is active.

BRIEF DESCRIPTION OF THE DRAWINGS

The invention will be better understood by an examination of the following description, together with the accompanying drawings, in which:

FIG. 1 illustrates, in three-dimensional form, the elements of the system;

FIG. 2 is a schematic drawing of a system set up in a banking environment;

DESCRIPTION OF PREFERRED EMBODIMENTS

Figure 3:
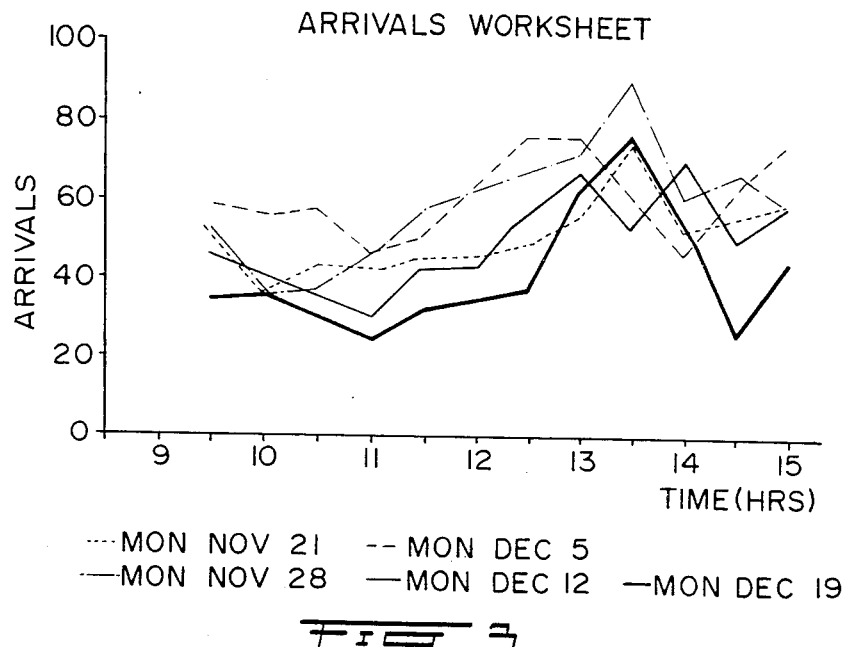
FIG. 3 shows the arrival rates for five Mondays.

Referring to FIG. 1, the system requires sensors for sensing the presence of customers to provide signals for counting the customer arrivals and the customer departures. The sensor 1 illustrated in FIG. 1 comprises a radar-like device which transmits a signal to be bounced off a customer. When there is a customer present, the signal will bounce off a customer, indicating the presence of a customer. When there is no customer present, then the signal will not return to the sensor so that, in this way, the sensor senses the absence of a customer in the path of the transmitted ray.

It will of course be appreciated that other types of sensors could be used. Thus, one could utilize a light beam in association with a light sensitive element. The light beam which shines across the customer's path would illuminate the light sensitive elements in the absence of a customer. When a customer crosses the light beam the beam would be broken, and the presence of a customer would be so sensed.

In addition, it is possible to use mechanical type switches for sensing of customers, although such mechanical type switches are not desirable in a banking environment. Regardless of what type of sensor is used, the output of the sensor will provide information as to the number of customers which appear at the sensor location to provide a count of the customers.

The prompter 3 is a light standard, located, as will be seen in the discussion of FIG. 2, at each teller station. The prompter is preferably of a type as described in Canadian Pat. No. 1,137,615 issued Dec. 14, 1982. However, other prompters can, of course, serve the same purpose. It is only necessary that the prompter be capable, either by itself, or in association with other hardware, of detecting the presence of a customer at a teller station. The prompters will have three states as follows:

OFF—when there is no teller available at that teller station.

ON-OCCUPIED—a teller is available at the station and a customer is present at the station.

ON-UNOCCUPIED—a teller is available at the station but there is no customer present at the station.

In the prompter as taught in the Canadian Patent, the first condition is indicated by the prompter being switched to OFF and the light of the prompter being therefore unilluminated. When the teller switches the prompter ON, the light flashes 8 times and then remains ON steadily to indicate that this available teller is unoccupied. When a customer arrives at the teller's station, the prompter is, once again, unilluminated.

The director 5 allows the next customer to be audibly and visually alerted that a teller is available. It also indicates, by the arrows 5a and 5b, in which direction the available teller may be found.

At the heart of the system is the computer means illustrated at 7 in FIG. 1. The computer preferably comprises a keyboard 71, for inserting programmes or additional data, a display 73, and a paper printer 75. The computer is programmed to process the data fed thereto as will be described below.

Referring now to FIG. 2, the customers 9 are formed in a queue 10 while waiting to approach a teller station 11 when a free teller 13 is available. The customers enter the queue at the entrance 10a and exit the queue at the exit 10b.

The queue is formed in a physically defined area, for example, it may be an area roped off with ropes 12.

As seen in FIG. 2, a first line sensor 1a is located at the entrance to the queue, and a second line sensor 1b is located at the exit thereof. Each sensor comprises two light beams, a forward beam and a rearward beam, and the direction in which a customer is moving determines which beam is broken first so that it can be determined whether a customer is entering or exiting the queue.

The outputs of the line sensors are fed, by means not shown, to the computer 7 which may be located, for example, at a supervisor's station 15. In a like manner, the output of the standards 3 are also fed to the computer.

The data collection equipment, in addition to the above, consists of a queue sensor interface board, a battery backed up clock/calendar and memory board, and a tape recorder used for mass storage. In one embodiment, the computer is a micro computer and the memory board is a CMOS RAM.

The computer consists of two modules: the master module and the keyboard module. The master module includes a printer, a display, and micro processor components. The micro processor used is a 6502 8-bit CPU. The 6502 addresses 4K bytes of on board RAM and 20K bytes of on board ROM. The other micro processor components include: a Versatile Interface Adapter (VIA), a Ram-Input/Output Timer (RIOT), a Peripheral Interface Adapter (PIA), ROMS and RAMS.

A 20-column thermal printer 75 provides a permanent record of user commands and reports. A LED display 73 provides visual feedback during keyboard operations. The display length of 20 characters corresponds with the printer. The keyboard module contains a 54-key full-size keyboard 71.

A teller and queue interface board is used to translate the analog prompter status information to digital data. The board is addressed through the VIA chip. Address 0 gives the on or off status of prompters 1 to 8. Address 1 gives the busy or not busy status of prompters 1 to 8. All even addresses give on/off information and odd addresses give busy/not busy information. The highest interfce address is 7. The system can contain up to 30 prompters and 4 single infrared line sensors. The status of each prompter and line sensor is updated every $\frac{1}{3}$ of a second.

A clock/calendar board contains both a battery backed up clock/calendar chip and 4K of CMOS battery backed up memory. The clock chip is used to keep time of day information during periods when the system is turned off. The 4K memory is used to retain important system information during a power failure.

The system uses a queuing model to obtain forecasts of waiting time (for customers) and teller utilization. The model is known as the M/Ek/C model, where M denotes Poisson arrivals, Ek denotes Erlangian service times with shape parameter k, and C denotes the number of servers, or, in the present application, tellers.

It is believed that the Poisson probability distribution is the best model of arrival patterns found in banks. The Poisson distribution is based on the following assumptions:

(a) Customers decide to go to the bank independent of each other, and (b) customers arrive with constant intensity within a given interval (i.e. within a given hour, or within a given day).

It will of course be appreciated that the above assumptions are not completely true for customer arrivals at a bank. Nevertheless, the deviations from the assumptions are not great enough to invalidate use of this distribution in the model.

The Poisson probability distribution is defined by its probability density function. If X has a Poisson distribution with parameter P then its probability density function is:

$$F_X(x) = P^x/x! \cdot e^{-P} \quad x = 0, 1, 2, \ldots, P > 0$$

where its mean $= P$ and its standard deviation $= P^{1/2}$.

The Erlangian probability distribution was used to model the service time patterns found in banks. This particular distribution falls in the middle ground between the great variability of the exponential distribution and the zero variability of the degenerate distribution (i.e. constant service times).

If T has an Erlang distribution with parameters A (a positive number) and K (a positive integer), then its probability density function is:

$$f_T(t) = (A*K)^K/(k-1)! \cdot t^{K-1} \cdot e^{-K*A*t}, \text{ for } t >= 0$$

where its mean $= 1/A$ and standard deviation $= 1/A*K^{-1/2}$

A is the "scale factor" determining the mean, and

K is the "shape parameter" determining the degree of variability.

Studies have revealed that the arrival rate of customers varies during the day in a fixed pattern. This is obviously so since a large number of customers choose to do their banking during lunch hour. The arrival rate just after opening is also higher than the daily average. At opening, customers often line up outside the bank and then enter simultaneously. In order to take these variations into consideration, the day was split into 30 minute intervals and the arrival rate during each of the intervals is then considered to be constant.

After reviewing several weeks of arrival data, certain similarities became apparent. For example, daily arrival rates are very similar from week to week, i.e. Monday arrival rates are similar from week to week, but possibly different than Friday arrival rates.

FIG. 3 shows the number of arrivals for five Mondays. As can be seen, Mondays are pretty steady for most of the day but begin to rise sharply at about 12:30, reaching a peak at about 1:30. The rate then drops, falling to the average rate at about 2:30.

FIG. 3 also illustrates some differences which may not be as easy to forecast. On one particular day there was a bad storm and many people stayed at home. The arrival rate for the day is illustrated in FIG. 3 by a 20% drop.

When the customers reach the teller's station, the number of transactions they are likely to undertake is limited. Most of these transactions involve some sort of interaction with a computer terminal and/or the counting of items such as cash. Since the transactions require, respectively, a fixed amount of time, it might be thought that the service times could be determined by knowing the number of transactions made. However, as there are some transactions which are very time-consuming, the following assertion is not always true. In the case of a long transaction, the service time is determined not only by the number of transactions but by the occurrence of one of the lengthier transactions. Fortunately, the latter type is the least probable to occur.

In a study conducted in different banks, it was found that the service time distribution could be reasonably approximated using an Erlangian distribution with a shape factor k=3. For an average service time of 1.5 m this gives a standard deviation of 0.8.

Figure 4:
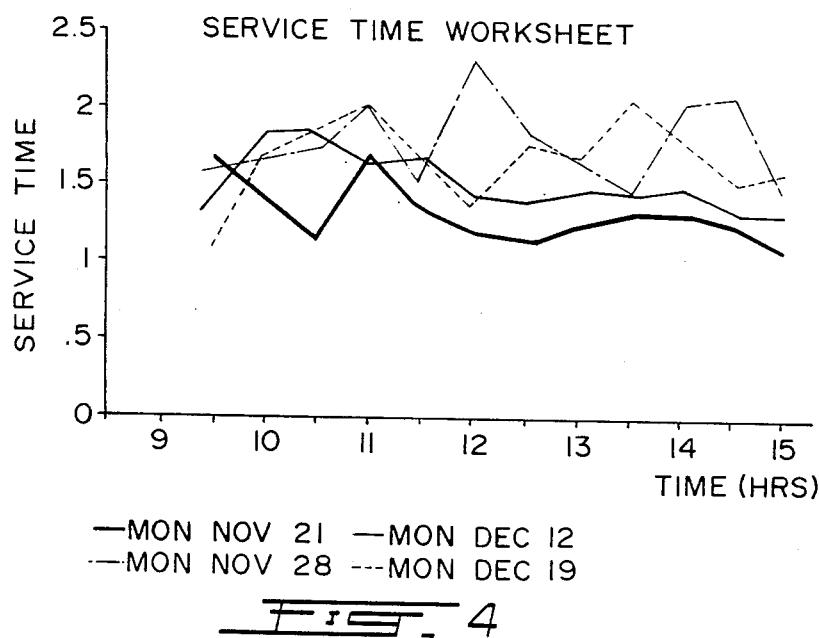
FIG. 4 shows the service rates for four Mondays.

FIG. 4 illustrates the average service time at different times of the day on four different Mondays. As can be seen, there is no evidence to indicate that the length of service time is a function of the time of day.

To forecast waiting time and teller utilization, it is necessary to use, in addition to the queuing model, the standard formulae:

(1) $Ro = La/(C*Mu)$
(2) $W_q = L_q/La$ where:
Ro = Traffic intensity (load)
La = Arrival rate
Mu = Service rate
C = The number of servers
$L_q$ = Average queue length
$W_q$ = Average waiting time Waiting time forecasts are based on the above formulae and the M/E3/C model. Using analytical methods, the waiting time for various queuing systems were computed and compiled into a table which is used to relate a given waiting time to a load factor (RO = customers/teller).

By keeping a record of the number of arrivals observed during each thirty minute interval, and by keeping the average service time for each day of the week, it is possible to compute the number of tellers needed. This is done by using formula (2), a queue length to load table, and formula (1), a realigned to solve for C and using the value from the queue length to load table for Ro.

The teller efficiency forecast is also based on the above formula and the M/E3/C model. By using computer simulation for various M/E3/C queuing systems, a relationship between average teller efficiency and system load was established. A performance study was also conducted for teller efficiency with the same results as those for the waiting time forecasts.

The system software consists of five parts, as follows: operating system, data collection routines, report generator, teller forecasting and monitor.

The operating system itself consists of four basic components as follows:

1. Process dispatcher which selects the next process to be run. The process dispatcher searches through a 16-element table to find the next process to be run. The first element of the table corresponds to the process which has the highest priority and the last element corresponds to the process with the lowest priority. Each process can be scheduled for multiple "runs" up to 256 times. Each system process is linked to the dispatcher through a vectored branch. The scheduled routine returns to the dispatcher through a jump instruction. Each system process is carefully placed in the priority list so that deadlocks are avoided.

2. The "run at" utility which ensures that a particular process is run at a fixed time of day or after a fixed interval of time. This process is scheduled to run by an interrupt service routine every second. A timeout counter is associated with each system process. When this counter reaches zero, the associated process is scheduled to run. If it has been requested, the timeout counter will be reloaded and a new count down will be initiated.

3. Input/output routines and drivers. These routines handle all system communication. The system has a number of external devices which communicate through the system input/output routines. The system devices include:

(a) Keyboard input and debounce routines.
(b) Printer output routines.
(c) Cassette input/output routines.
(d) Queue sensor and teller prompt data input routines.
(e) Clock/Calendar interface routines.

4. Interrupt service routine is initiated by a count down timer every 1/16 of a second. This routine controls all system timing functions and also schedules the "run at" process. It also takes care of essential data buffering such as the keyboard, the queue and the teller input data.

5. A set of routines which handle all the arithmetic computations. These routines include both unary and binary operations. The operations include: shift right, shift left, "+", "−", "*" and "/". All operations are done in postfix notation and all computations are done in 16 or 32 bit fixed integer.

A practical implementation uses a 16 bit stack stack where values are pushed and pulled. It also uses a 32 bit accumulator to perform multiplication and division. Values are pushed onto the stack, the operation is performed and the result replaces the values on top of the stack.

The data collection routines are grouped together in three parts as follows:

(1) Teller line queue sensor debounce

These routines take care of the noise filtering necessary. In the case of the teller prompters, considerable noise is generated when a prompter is switched on. When switched on, the prompter is out of synchronization with regard to the rest of the prompters. In this state, the prompter will possibly transmit its status information outside of its allocated transmission window. This state will persist until the next synchronization pulse is received by the prompter.

Each prompter is assigned a positional number which numbers increase to the left and to the right of the director. A delay is imposed on all state changes with respect to the positions either to the left or to the right. This is done to minimize error. Each delay represents the minimum amoun of time it would take a customer to run from the front of the line to that teller's station. By imposing the delay, a prompter will change state only after enough time has elapsed for a customer to go from the front of the line to that teller's station. As can be appreciated, only a small delay will be needed for the four prompters on each side of the director. The delay will, of course, increase as the position of the prompter from the director increases.

The queue line sensors are also debounced. The direction of an entering or exiting customer is determined, as above mentioned, by which beam was first broken. To determine whether a customer has completely entered or exited the line, it is the final beam cleared which is monitored.

(2) One second data filtering

The one second level represents the smallest time unit at which events are recorded. Associated with each teller station are two timers that record the number of seconds up to 59 seconds that the station has been open and also the time it has been busy. A count of the number of customers served at that station is also recorded. This is done by monitoring the teller prompt state change from not busy to busy. It is assumed that such a state change is caused by a new customer and not by the same customer. A minimum customer transaction time is set to ten seconds so that a customer walking by an open and not busy station will not be recorded as served by that station. When a prompter is switched on, its initial state is set to not busy so that a customer already at the station will be recorded when the state of the prompter changes to busy.

As each customer enters the queue a timer is started which records the number of seconds spent waiting. When a customer departs from the queue the timer is stopped and the time is recorded. This time is measured by measuring the time elapsed between the nth pulse at the input of the queue and the nth pulse at the exit thereof. Customers in the queue are assumed to behave in a first come first served fashion, and customers departing from the rear of the queue are ignored. Each second, a count of the number of customers in the queue is made and this count is used to compute the average number waiting. The waiting time and the number in the queue is also recorded for those who waited for more than 30 seconds. These figures are used to compute the average delayed queue waiting time and the average delayed number in the queue.

(3) One minute data accounting (X) minutes, 30 minutes and end of the accounting This routine records the collected data in units of one minute. It also splits the collected information in three groups: X minutes of data, 30 minute data and total of the day data. The X minute data is used for printed reports on the printer and the user is free to set the report interval. The 30 minute data report is written to cassette tape every 30 minutes. These tapes are later read by the "base station program" and used to generate other types of reports. The total of the day report is written both to the printer and to the cassette tape.

The generated reports provide an overview of queue line and teller activities. There are three basic report types:

(1) Teller report
(2) Branch summary
(3) Daily summary

All data reports are based on formulae which accurately describe the method by which the reported information is processed. The reported information consists mostly of totals and averages, calculated both for the tellers and for the queues.

Teller reports use the following formulae (all times are in minutes):

Open-time(i) = (total time open for teller station "i")
Active-time(i) = (total time station "i" was active serving)
No-served(i) = (total number served by station "i")
Branch-open = (Total time the branch was open)
Aug-service-time(i) = Active-time(i)/No-served(i)

Teller-utilization(i) = Active-time(i)/Open-time(i)
Branches summaries use the following formulae:

$$\text{Average-open} = \sum_{i=1}^{i=30} \text{Open-time}(i)/\text{Branch-open}$$

$$\text{Average-service} = \sum_{i=1}^{i=30} \text{Active} = \text{time}(i)/ \sum_{i=1}^{i=30} \text{No served}(i)$$

$$\text{Served} = \sum_{i=1}^{i=30} \text{No-served}(i)$$

$$\text{Aug-utilization} = \sum_{i=1}^{i=30} \text{Active-time}(i)/ \sum_{i=1}^{i=30} \text{Open-time}(i)$$

The maximum number of tellers in the system is 30. The following formulae are used for the customer queue:
Wait-begin = (number in queue at beginning of period)
Wait-end = (number in queue at end of period)
Cust-wait(j) = (total wait time for customer "j")
Cust-delayed(j) = (total wait time for customer "j" if wait >30 sec.)
Cust-delayed-time = (total ·while one customer must wait >30 sec.)
No-delayed = (Total number of customers with wait >30 sec.)
Queue-size(t) = (queue size at time "t")
Queue-delayed-size(t) = (queue size at time "t" if wait >30 sec.)
Arrivals = Served-Wait-begin + Wait-end $$\text{Aug-line-size} = \sum_{t=0}^{t=\text{Branch-open}} \text{Queue-size}(t)/\text{Branch-open}$$

$$\text{Aug-delayed-size} = \sum_{t=0}^{t=\text{Branch-open}} \text{Queue-delayed-size}(t)/\text{Cust-delayed-time}$$

$$\text{Aug-waiting-time} = \sum_{j=1}^{j=\text{Served}} \text{Cust/wait}(j)/\text{Served}$$

$$\text{Aug-delayed-time} = \sum_{j=1}^{j=\text{Served}} \text{Cust-delayed}(j)/\text{No-delayed}$$

Delayed time is defined as the amount of time an arrival has to wait, only if the arrival has to wait more than 30 seconds. A waiting time of less than 30 seconds is considered as a walk through.

The teller forecasting reports provide information on teller complements which enable bankers both to determine how many tellers should be hired for each bank, and how to schedule these tellers more efficiently. To obtain the forecast, a record of previous week's arrivals are recorded for each 30 minute period. Together with the average service time, a historical arrival pattern is created. This information is then used as input to a queuing model, which relates the waiting time to the expected load of the system and to a particular teller utilization. Forecasts can be based on a given average waiting time or a given teller utilization. The model used is condensed into two tables, one which relates waiting time and load and the other of which relates teller utilization and load.

To compute the historical information, the following formulae are used:
For the first week's data:
New Entry-Arr
For the next 13 weeks (13 weeks is one season):
New Entry = (Old Entry*N + 2*Arr)/(N + 2)
Then for the next n weeks:
New Entry = ((Old Entry*12) + Arr)/13
Where:
New Entry is the new 30 minute entry,
Old Entry is the old 30 minute entry,
Arr is the current 30 minute arrivals,
N is the current number of historical weeks.

The equivalent formulae are also used to compute the historical average service time.

A waiting time forecast is based on a given waiting time. The given waiting time is related to a load factor through the following formula and an average line size to load table.

Line-size = Hist-arr*Waiting-time/30
Where:
Line-size is the average line size
Hist-arr is the historical arrivals for that period
Waiting-time is the average waiting time
30 is the duration of all historical periods.

Given a load factor the following formula is used:
Requ-numb-tel = (Hist-arr*Hist-avg-service)/(30-*Load)
Where:
Requ-numb-tel is the required number of tellers
Hist-avg-service is the historical service time
Load is the load factor Teller utilization forecasts are based on a given teller utilization rate (T.U.) and produced from a T.U. to load table and the same formula as above.

Although particular embodiments have been described above, this was for the purpose of illustrating, but not limiting, the invention. Various modifications, which will come readily to the mind of one skilled in the art, are within the scope of the invention as defined in the appended claims.

We claim:

1. A method of providing efficient use of tellers and for forecasting customer traffic and teller utilization on a continuous basis at a bank wherein any one of a plurality of customers may be serviced by any one of a plurality of tellers at a respective one of a plurality of teller stations and to arrange teller work schedules for the future, the customers being formed in a queue while awaiting service, and wherein said queue is formed in a physically defined area having an entrance and an exit; said method comprising the steps of:
   A. DATA SENSING AND COLLECTING:
      sensing the arrival of customers at the entrance of said queue;
      recording the number of such arrivals and the time of each arrival;
      sensing the departures of customers from said exit of said queue;
      recording the number of departures and the time of each departure;
      sensing the time spent by each customer in said queue;
      recording the time spent by each customer in said queue;
      determining whether a teller is available at each teller station;
      recording the amount of time that a teller is available at each of the stations;
      determining whether a teller at a station is active or inactive;
      recording the amount of time that a teller at each station is active;

sensing the number of customers serviced at each station;

recording the number of customers serviced at each station;

B. ANALYZING:

determining arrival patterns for customers for predetermined time periods based on said sensed and recorded data; and obtaining teller utilization forecasts;

C. SCHEDULING:

based on said arrival patterns, estimating a number of arrivals for each predetermined time period;

combining said estimates with said teller utilization forecasts;

positioning a number of tellers to respective teller stations for each predetermined time period of limit customer waiting time to a predetermined level during all predetermined time periods; and positioning the remainder of the tellers to perform non-teller tasks for each predetermined time period;

whereby providing efficient use of tellers while controlling customer waiting time.

* * * * *